(12) United States Patent
Cawse

(10) Patent No.: US 6,725,183 B1
(45) Date of Patent: Apr. 20, 2004

(54) METHOD AND APPARATUS FOR USING DFSS TO MANAGE A RESEARCH PROJECT

(75) Inventor: James Norman Cawse, Pittsfield, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/387,332

(22) Filed: Aug. 31, 1999

(51) Int. Cl.[7] .......................... G06F 7/60; G06F 17/10; G06F 101/00

(52) U.S. Cl. ............................. 703/2; 703/12; 700/97; 700/108

(58) Field of Search .............. 703/1–2, 12; 700/91–110

(56) References Cited

U.S. PATENT DOCUMENTS 5,856,554 A * 1/1999 Buysch et al. ............... 558/274
6,253,115 B1 * 6/2001 Martin et al. ................. 700/97
6,405,344 B1 * 6/2002 Ali et al. ....................... 716/2

OTHER PUBLICATIONS

Cawse et al, "Combinatorial Search and Experimental Design Techniques", 1999 ASA Quality and Productivity Research Conference (May 1999), paper available at: http://web.utk.edu/~asaqp/qpr/QPRC1999/papers/cawse_james.pdf.*
Normand et al, "Resolution of Insulation Related Manufacturing Problems Using the Six Sigma Methodology and Tools", IEEE Proceedings of the 1997 Electrical Insulation Conference, pp. 769–774 (Sep. 1997).*
Hoehn, "Robust Designs Through Design to Six Sigma Manufacturability", IEEE '95 Engineering Management Conference, pp. 241–246 (Mar. 1995).*
PCT International Search Report, WO 01/16785 published Mar. 8, 2001.*
Harrold, "Optimize Existing Processes to Achieve Six Sigma Capability", Control Engineering, vol. 46 No. 3, pp. 97–et seq (Mar. 1999).*
Caruana, "Combinatorial Chemistry Promises Better Catalysts and Materials", Chemical Engineering Progress, vol. 94 No. 10, pp. 11 et seq (Oct. 1998).*
Studt, "Combinatorial Chemistry Success Create New Process Demands", Research & Development, vol. 89 No. 12, pp. 38–42 (Nov. 1997).*
Tuttle et al, "Matching Models to Real Life for Defect Reduction", IEEE International Proceedings of Test Conference, pp. 217–223 (Oct. 1995).*
Breyfogle III, "Implementing Six Sigma: Smarter Solutions Using Statistical Methods," date unknown, John Wiley & Suns, pp. 3–27.*
Harvard Business Review, May–Jun. 1988, The House of Quality, John R. Hauser and Don Clausing, pp. 63–73.

* cited by examiner

*Primary Examiner*—Samuel Broda, Esq.
(74) *Attorney, Agent, or Firm*—Andrew J. Caruso; Philip D. Freedman

(57) ABSTRACT

In an exemplary embodiment, an application of combinatorial materials development with minimum materials development, minimum variance, and maximum integration is provided. The embodiment is directed to a method of project development of a combinatorial materials development process using DFSS techniques having four major elements. The first element is the use of a design for six sigma (DFSS) process mapping to convert a complex and disorganized process structure to an organized structure that can be further analyzed. The second element comprises the use of quality function deployment houses as a method of flowing critical to quality characteristics (CTQ) through a research project. The third element comprises a transfer function that connects the overall steps of the project to the output which is measured as variability not as mean. Score cards are used as the "function" to total the variabilities of each process step. The final element comprises an extension of design of experiment (DOE) techniques.

6 Claims, 18 Drawing Sheets

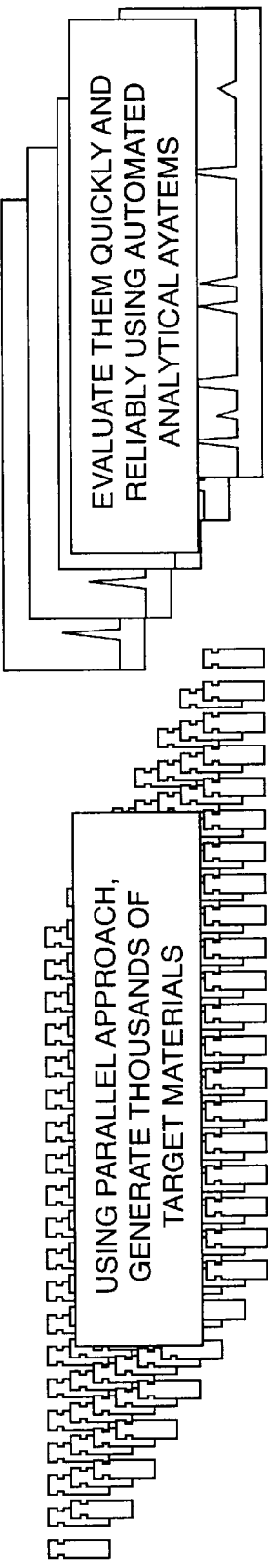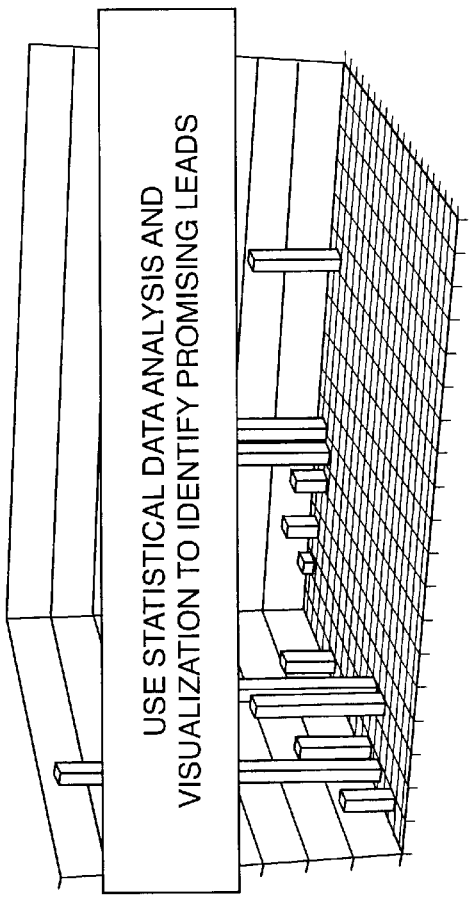
FIG. 1 COMBINATORIAL MATERIALS DEVELOPMENT
WHAT IS IT?
AN EXPERIMANTAL APPROACH TO RAPIDLY IDENTIFY OR OPTIMIZE NEW MATERIAL COMPOSITIONS.
USING PARALLEL APPROACH, GENERATE THOUSANDS OF TARGET MATERIALS
EVALUATE THEM QUICKLY AND RELIABLY USING AUTOMATED ANALYTICAL AYATEMS
USE STATISTICAL DATA ANALYSIS AND VISUALIZATION TO IDENTIFY PROMISING LEADS

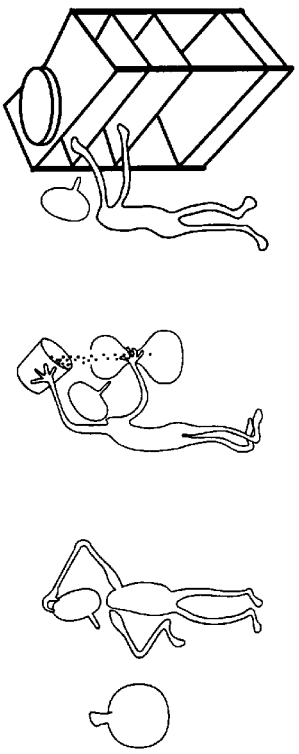
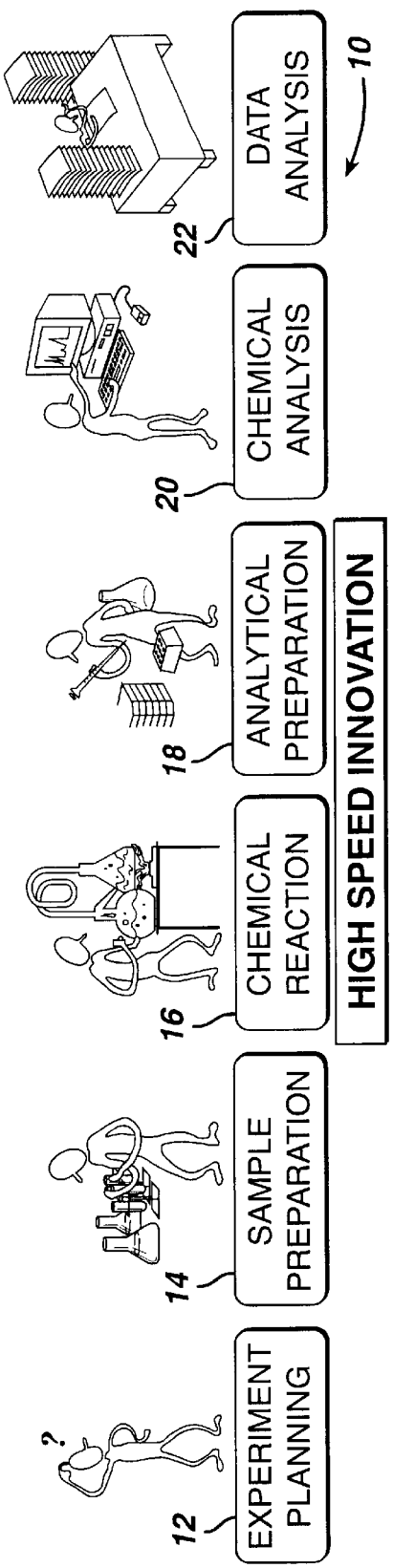
FIG. 2

COMBINATORIAL TRANSFER FUNCTION DEVELOPED

LITTLE y's:
- ACCURATE LEAD IDENTIFICATION
- RAPID LEAD IDENTIFICATION
- PD TURNOVER (TON) > 1000

SPECIFICATION:
95% PROBABILITY OF DETECTING 250 TON CATALYST ACTIVITY INCREASE

= f (SUBSYSTEM VARIABILITY)

SIGNAL/NOISE RATIO IS THE KEY

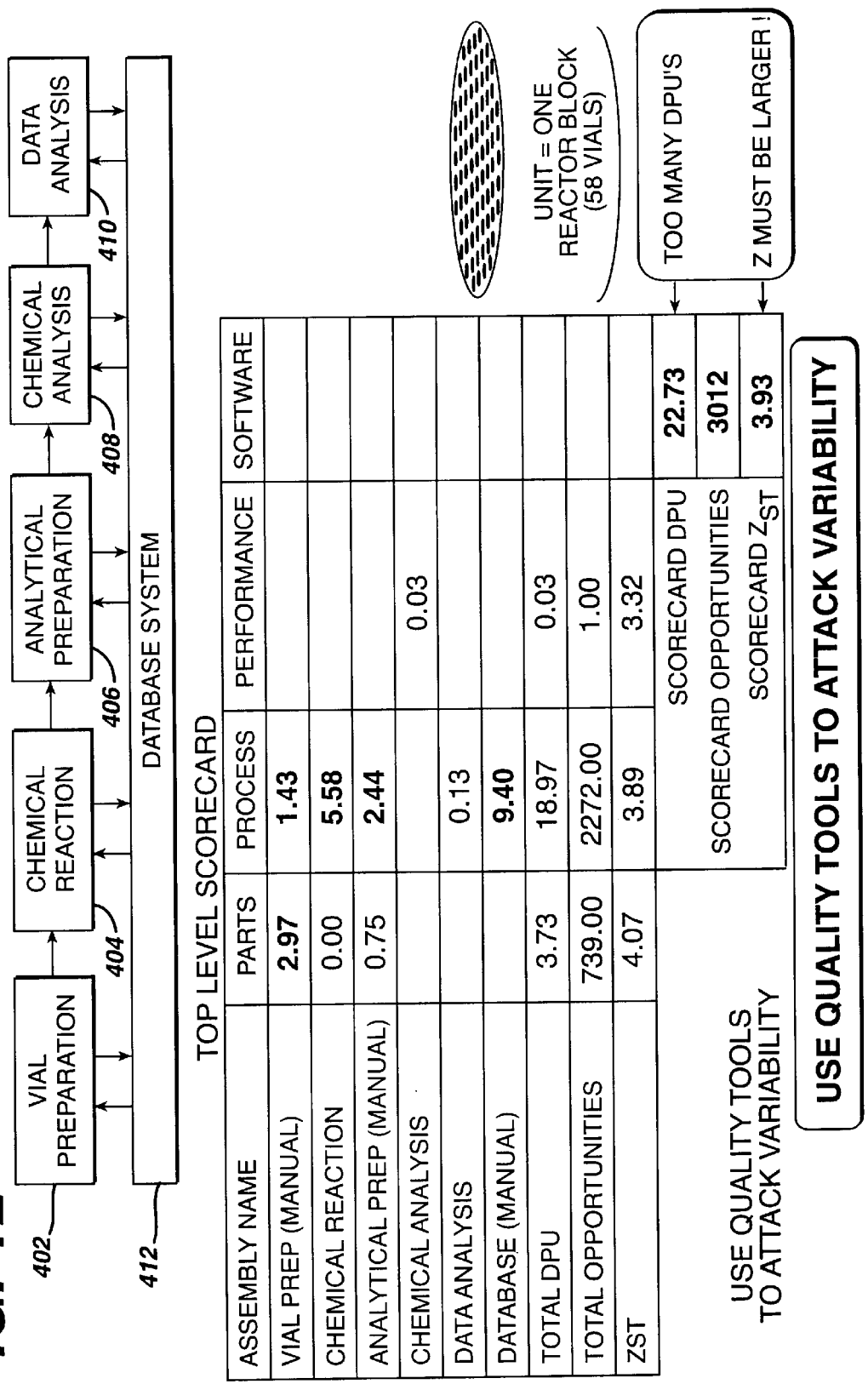
FIG. 12  SCORECARDS PREDICT INITIAL PROCESS CAPABILITY

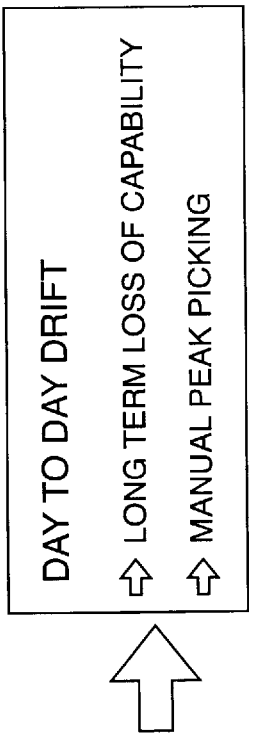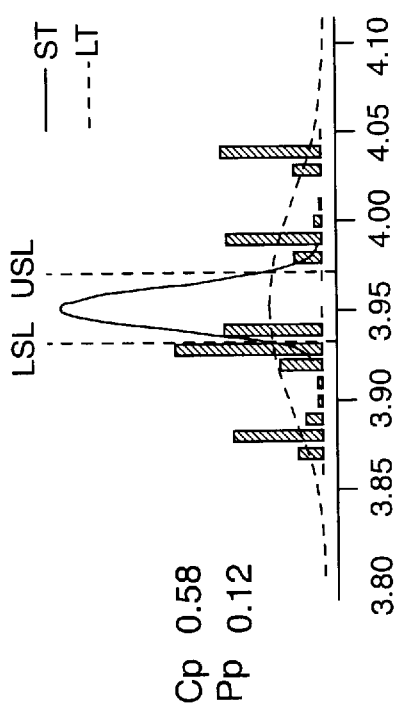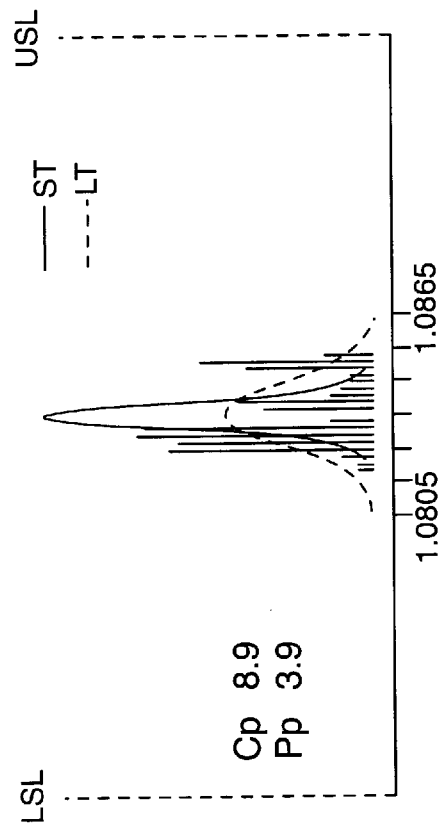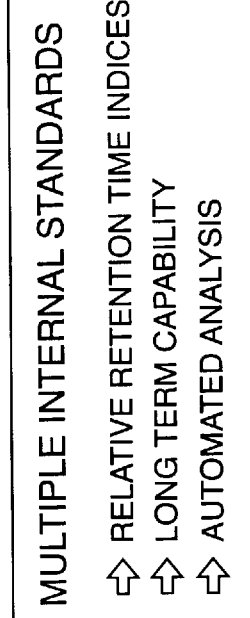
FIG. 13  SPECIFIC MAIC PROJECTS: CHEMICAL ANALYSIS
AUTOMATION REQUIRES PROCESS CAPABILITY ABOVE LAB NORMS

EVEN ROBOTS NEED SIX SIGMA!

FIG. 17 MAIC/DFSS PROJECTS IMPROVE SCORECARD

METHOD AND APPARATUS FOR USING DFSS TO MANAGE A RESEARCH PROJECT

BACKGROUND OF THE INVENTION

The invention relates to a novel application of a combinatorial materials development with minimum variance and maximum integration. In particular, the invention is a system and method of project development for a combinatorial materials development process using DFSS techniques.

As illustrated in FIG. 1 Combinatorial materials development (CMD) is an experimental approach to rapidly identify or optimize new material compositions or processes. CMD uses a parallel approach to generate thousands of target materials. The targets are evaluated quickly and reliably using automated analytical systems. The final step is to use statistical data analysis and visualization to identify promising leads.

FIG. 2 illustrates the transition from traditional chemical research to Combinatorial technology. From the 1890s to the 1990s chemists as individuals might perform one or two experiments per day with experimental sizes limited to 1 to 1000 grams per experiment. These 100 to 500 experiments per year might lead to 1 or 2 new leads per year.

Combinatorial technology 10 typically comprises several steps including: Experimental Planning 12; Sample Preparation 14; Chemical Reaction 16; Analytical Preparation 18; Chemical Analysis 20; and Data Analysis 22. These steps will be discussed further in relation to the use of six sigma techniques. In the 1990s, development of Combinatorial Technology permitted a team approach using experimental sizes 1 to 100 milligrams per experiment with 10 to 200 or more experiments per day. Depending on the chemistry involved, the 1000 to 10,000 or more experiments per year are likely to generate 10 or more new leads per year. The Combinatorial Technology approach can be used for discoveries of new materials when there are many possible components and small changes in components cause big changes in material properties. The CMD process may not be as effective for minimizing material problems where components are few and well known. The combinatorial approach was developed to overcome competitive threats, address the need for speed, reduced cost, and broad patent coverage, and to deal with increasing system complexity and expectations. The advantages of the CMD approach are high-speed innovation with the possibility of broad patent protection. The hardware and software that make CMD possible are now available.

For any process (business, manufacturing, service, research, etc.), the sigma value is a metric that indicates how well that process is performing. The higher the sigma value, the better the output. Sigma measures the capability of the process to perform defect-free-work, where a defect is synonymous with customer dissatisfaction. With six sigma, the common measurement index is defects-per-unit where a unit can be virtually anything. Examples include a component, a piece part of a jet engine, and an administrative procedure. The sigma value indicates how often defects are likely to occur. As sigma increases, customer satisfaction goes up along with improvement of other metrics (e.g., cost and cycle time).

The six sigma methodology has been used by a number of companies such as Motorola Semiconductors, Texas Instruments, Allied Signal and Digital Corporation. All of these companies use this process for a specific application such as semiconductor manufacturing in the case of Motorola and Texas Instruments. General Electric Company, the assignee of this application, has used six sigma technology in a wide number of areas.

FIG. 3 is a flowchart of a design for six sigma (DFSS) process in new product development. The overall DFSS process of FIG. 3 is divided into four sub-processes labeled Identify, Design, Optimize and Validate. Each sub-process includes sub-steps. The Identify sub-process includes sub-steps 102 and 104. The Design sub-process includes sub-steps 106–112. The Optimize sub-process includes sub-steps 114–126. The Validate sub-process includes sub-steps 128–134. The DFSS process shown in FIG. 3 is useful for improving the process of designing a product or procedure. The invention can also be applied to other six sigma processes such as the Measure, Analyze, Improve and Control (MAIC) process used for improving processes (such as manufacturing processes or business processes).

The six sigma process includes a method for identifying critical to quality (CTQ) dependencies in quality function deployment. Quality function deployment (QFD) is a methodology for documenting and breaking down customer requirements into manageable and actionable details. The concept of "houses of quality" has been used to represent the decomposition of higher level requirements such as critical to quality characteristics or CTQ's (also referred to as Y's) into lower level characteristics such as key control parameters or KCP's (also referred to as X's). FIG. 4 depicts a conventional house of quality hierarchy in which high level requirements such as customer requirements are decomposed into lower level characteristics such as key manufacturing processes and key process variables within the manufacturing processes.

Each house of quality has previously corresponded to a stage or level of the process of designing a product. At the highest level, represented as house of quality #1 152, customer requirements are associated with functional characteristics of a product. At the next level of the design process, represented as house of quality #2 154, the functional characteristics of the new product are associated with new product characteristics. At the next level of the design process, represented as house of quality #3 206, the part characteristics are associated with manufacturing processes. At the next level of the design process, represented as house of quality #4 208, the manufacturing processes are associated with manufacturing process variables.

Conventionally, new chemical entities with useful properties are generated by identifying a chemical compound (called a "lead compound") with some desirable property or activity, creating variants of the lead compound, and evaluating the property and activity of those variant compounds. Examples of chemical entities with useful properties include paints, finishes, plasticizers, surfactants, scents, flavorings, and bioactive compounds, but can also include chemical compounds with any other useful property that depends upon chemical structure, composition, or physical state. Chemical entities with desirable biological activities include drugs, herbicides, pesticides, veterinary products, and the like.

One deficiency in traditional chemical research pertains to the first step of the conventional approach, i.e., the identification of lead entities. As stated by Claudia M. Caruana, "Combinatorial Chemistry Promises Better Catalysts and Materials", Chem. Eng. Prog., October 1998, p 11–14, "Typically, catalyst discovery involves inefficient trial-and-error, because catalytic activity is difficult to screen." Consequently, a fundamental limitation of the conventional approach is the ability to generate and analyze large numbers of catalyst candidates. The generation of such candidates is very labor intensive and time consuming. For example, it takes many chemist years to produce and evaluate even a small subset of the variants in a single catalyst system. Caruana, in the article referenced above, states that "conventional discovery strategies usually are based on the time-consuming "one-sample-at-a-time" approach, which can take months or years to determine suitable candidate materials."

Recently, attention has been focused on the use of combinatorial chemical methods to assist in the generation of new materials development leads. "Combinatorial chemistry uses a parallel approach to discover thousands of target materials and then produces "libraries" of these substances quickly." (Ref.: Caruana) A combinatorial materials library is a collection of diverse materials generated by either chemical synthesis or by a combination of formulation and process steps, combining chemical "building blocks" such as reagents. For example, a combinatorial catalyst library is formed by combining precursor solutions to generate an array of formulations, subjecting it to appropriate processing conditions to produce (possibly) active catalysts, and evaluating the activity of each formulation. Millions of potential catalysts or other materials theoretically can be generated through such combinatorial mixing of chemical building blocks and multiple process steps. For example, Peter Schultz in "Generating New Molecular Function: a Lesson from Nature", Angew. Chem. Int. Ed, 1999, 38, 36–54, has observed that "Given approximately 60 elements in the periodic table that can be used to make compositions consisting of three, four, five, or even six elements, the universe of possible new compounds remains largely uncharted."

However there is a need for a system and method for efficiently and effectively generating new leads designed for specific utilities. Combinatorial technology has the ability to develop many leads, but the variability in the results develops many inefficiencies. There is a need to reduce the variability of the results in combinatorial technology processes.

SUMMARY OF THE INVENTION

Acordingly, the invention relates to a system for implementing a combinatorial chemistry research project using Design for Six Sigma (DFSS) techniques. In an exemplary embodiment, a novel application of a combinatorial materials development with minimum variance and maximum integration is provided. In particular, the present invention provides a system and method of project development of a combinatorial materials development process, such as catalyst development, using DFSS techniques.

The process has four major elements. The first element is the use of a Design for Six Sigma (DFSS) process mapping to convert a complex and disorganized process structure to an organized structure that can be further analyzed.

The second element comprises the use of quality function deployment (QFD) houses as a method of flowing critical to quality characteristics (CTQ's) through a research project. After the customer CTQ's and the measures are developed conventionally in House 1, a novel usage of QFD is done by making the entire project the "product" which is analyzed by House 2. Individual process elements of the project are analyzed for CTQ's, and those CTQ's become the "how's" in the QFD House 2. Doing this allows effective prioritization of all the Measure, Analyze, Improve and Control (MAIC) projects applied to each process element.

The third element comprises a transfer function that connects the overall steps of the project to the output which is measured as variability not as mean. Score cards are used as the "function" to total the variabilities of each process step.

The fourth and final element comprises an extension of design of experiment (DOE) techniques. Conventional DOE's, discussed above, are ineffective for combinatorial chemistry because of the large size and complexity of the experiments. Additionally, in the context of these particular experiments for catalyst development, generally only synergistic effects of co-catalyst combinations are meaningful. This requires novel DOE approaches such as full combinatorial designs.

The combined use of combinatorial techniques and six sigma techniques as disclosed herein reduces the variabilities in the results, thereby producing a better result from the development program. These and other features and advantages of the present invention will be apparent from the following brief description of the drawings, detailed description, and appended claims.

BRIEF DESCRIPTION OF THE DRAWINGS

The invention will be further described in connection with the accompanying drawings in which:

FIG. 1 illustrates a combinatorial materials development program;

FIG. 2 illustrates the development of combinatorial technology;

FIG. 12 illustrates the use of a scorecard to predict an initial process capability;

FIG. 13 illustrates a first specific MAIC project;

DETAILED DESCRIPTION

Figure 5:
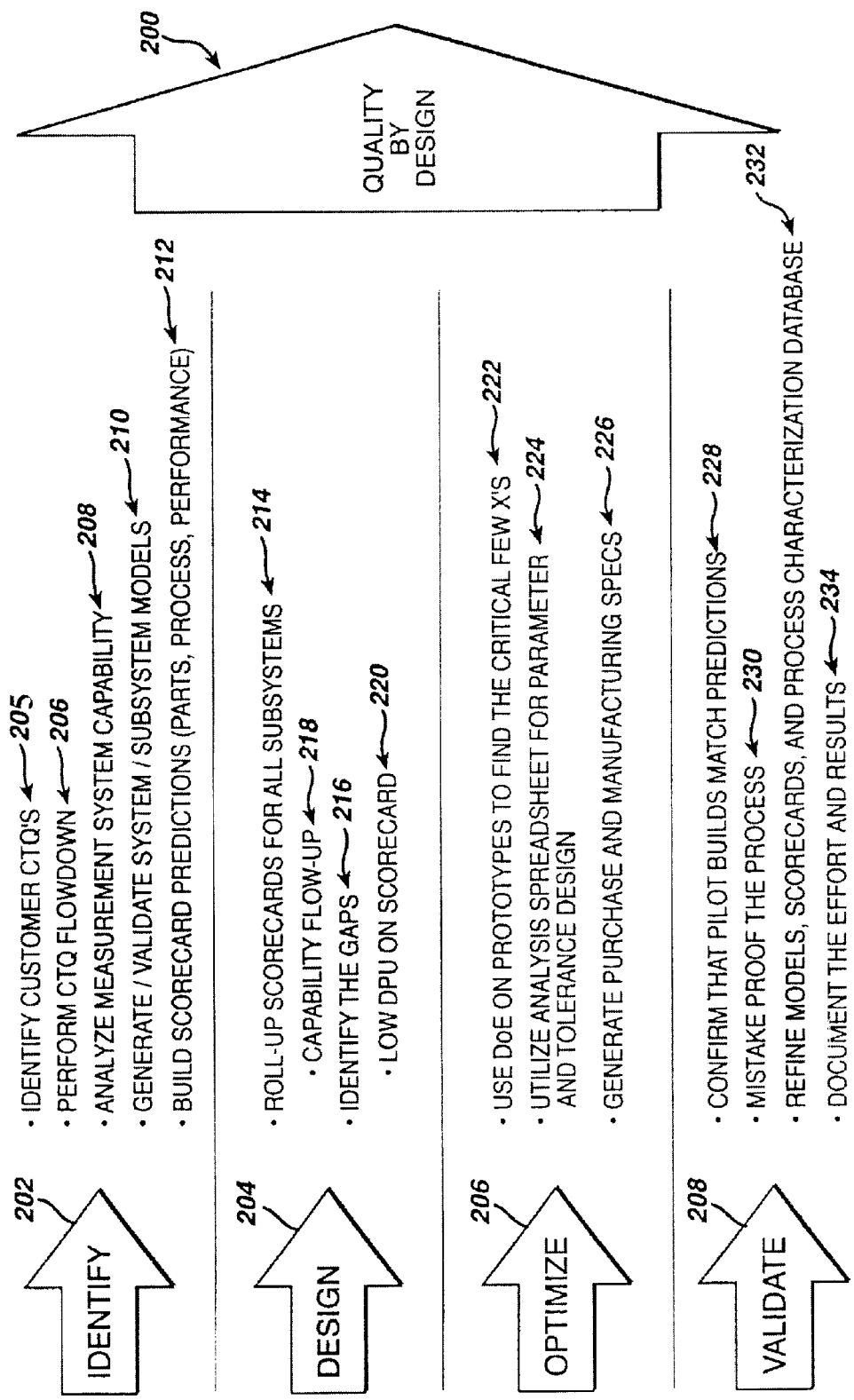
FIG. 5 illustrates the combination of combinatorial technology and DFSS.

An exemplary embodiment provides a system for project development of a combinatorial materials development process using DFSS techniques. As illustrated in FIG. 5, using DFSS techniques with CMD involves four major steps for reaching Quality by Design 200: Identification 202; Design 204; Optimization 206; and Validation 208.

In the Identification 202 phase, the process identifies customer critical to quality characteristics (CTQ) for needed materials 205 and performs a CTQ flowdown 206. The identification phase additionally analyzes the measurement system capability 208 and generates and validates system and sub-system modules 210. As a result, the identification stage builds scorecard predictions based on parts, process and performance factors 212.

In Design stage 204 there is a roll-up of Scorecards for all sub-systems, including a capability flow-up 214. Design stage 204also identifies the gaps, including a low defects per unit (DPU) on a scorecard 220.

In Optimization stage 206, there is use of Design of Experiment (DOE) on prototypes to find the critical few X's 222. Optimization stage 206uses an Analysis Spreadsheet for parameter and tolerance design 224 and generates purchase and manufacturing specifications 226.

Validation stage 208 confirms that pilot builds have matched predictions 228. Validation stage 208attempts to mistake proof the process 230. Additionally, Validation stage 208 refines the models, scorecards and product characterization database 232. The Validation stage documents the effort and the results 234.

The number of patents issued to pharmaceutical companies has grown significantly since the late 1980s when the combinatorial approach was embraced by the pharmaceutical industry. In addition to pharmaceutical technology, the combinatorial approach has significant application in: plastics, including catalysts, carbon fibrils and blends; lightning, including fluorescent lamp cathodes, phosphors and LED; medical systems including scintillators and superconductors; and aircraft engines and turbines, including coatings and alloys. The assignee has experimentally testing combinatorial technology using a DFSS approach to develop a highly productive process for synthesis and screening of chemicals. Additionally, the combined approach has been used to identify longer term opportunities for use of combinatorial methodology for new materials discovery.

Figure 6:
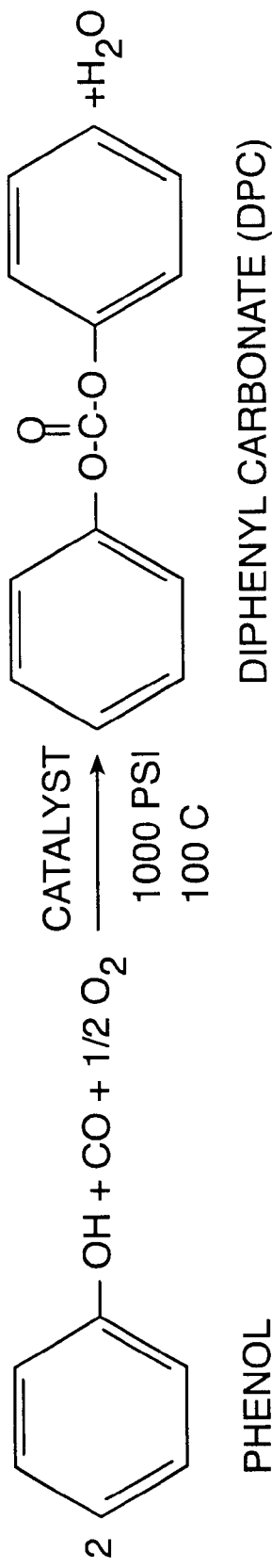
FIG. 6 illustrates a catalyst goal in a combinatorial process.

As shown in FIG. 6, an example of a research project is a Combinatorial Process Pilot System for Diphenyl Carbonate (DPC) reaction. The goal is to search for a new catalyst that improves the output of DPC. Diphenyl carbonate is an ingredient used in the manufacture of polycarbonate. Two hundred fifty million pounds per year of DPC are needed in each new polycarbonate plant. Polycarbonate is currently made with a 2 step technology. With a new catalyst, a one step process is possible resulting in significant capital cost and variable cost reduction.

Figure 7:
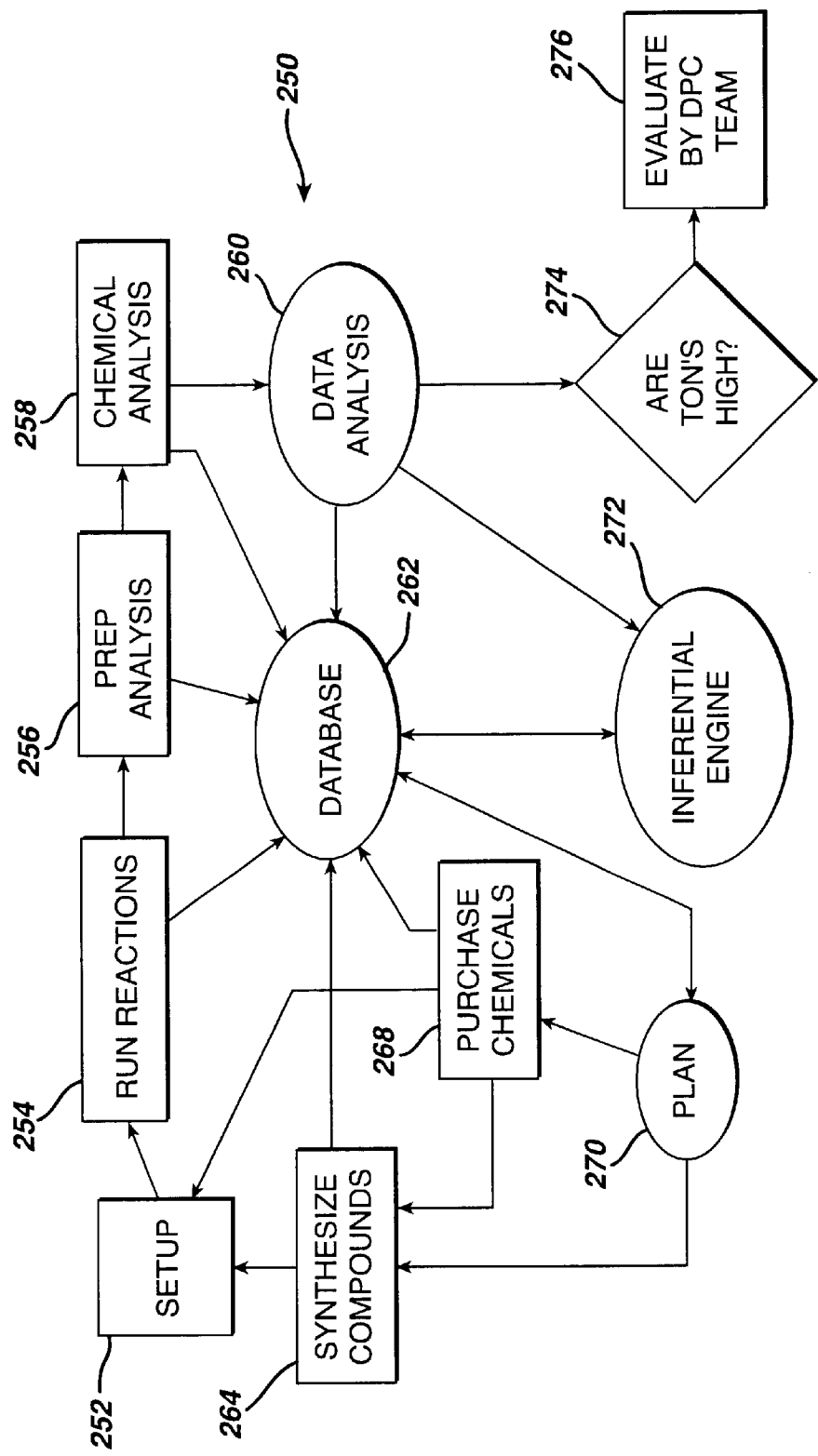
FIG. 7 illustrates the combinatorial discovery cycle.

As seen in FIG. 7, a combinatorial discovery cycle 250 is a complex disorganized process structure with multiple interconnected elements 252–276. The exemplary embodiment converts this complex, disorganized process structure into an organized structure that can be further analyzed. Even though the efficiency of a combinatorial process is much greater than traditional techniques discussed above, the variation possible in each step of the combinatorial process make the combinatorial discovery cycle a complex process that requires structure and discipline.

Figure 3:
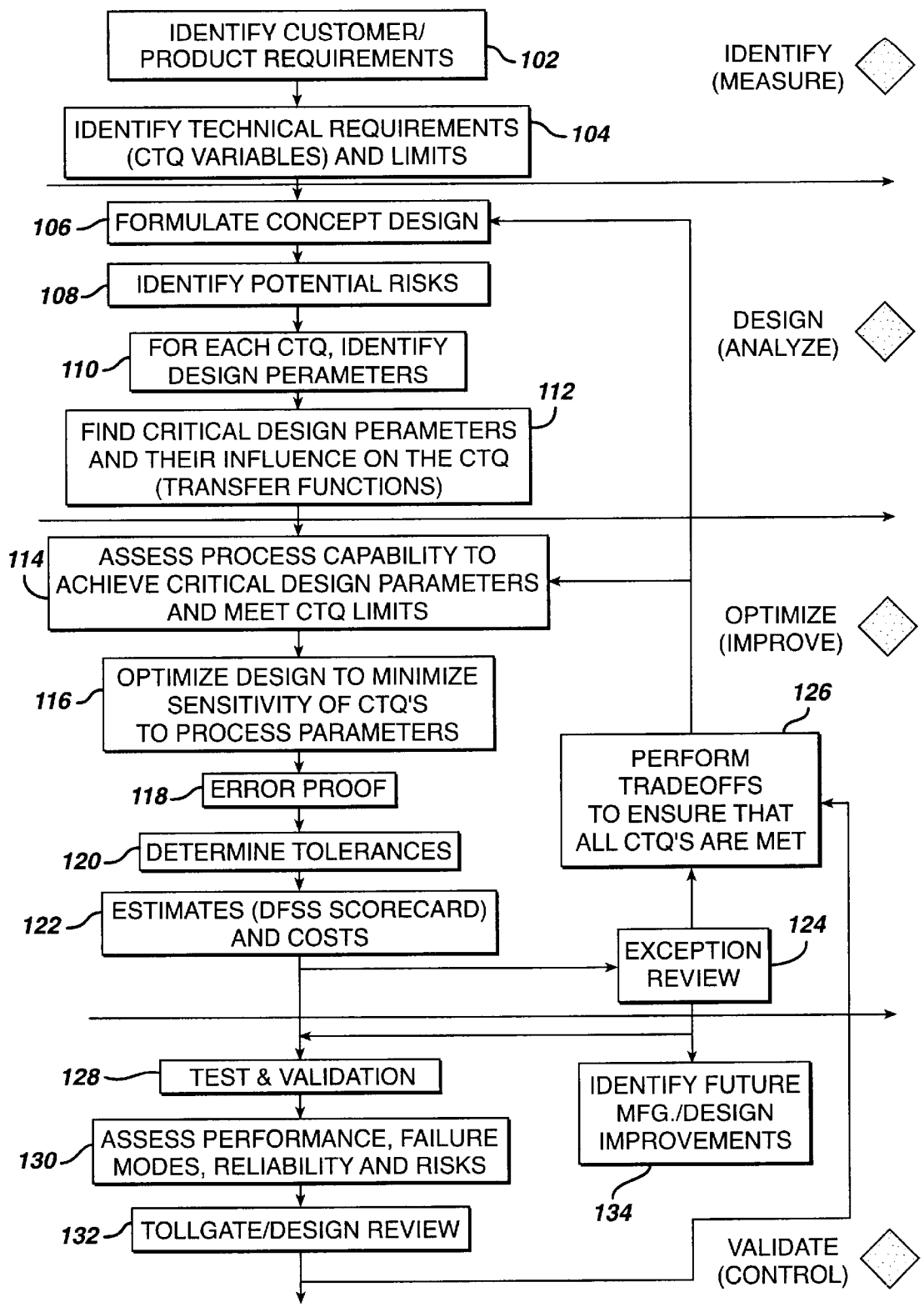
FIG. 3 illustrates a six sigma flow stet.
Figure 4:
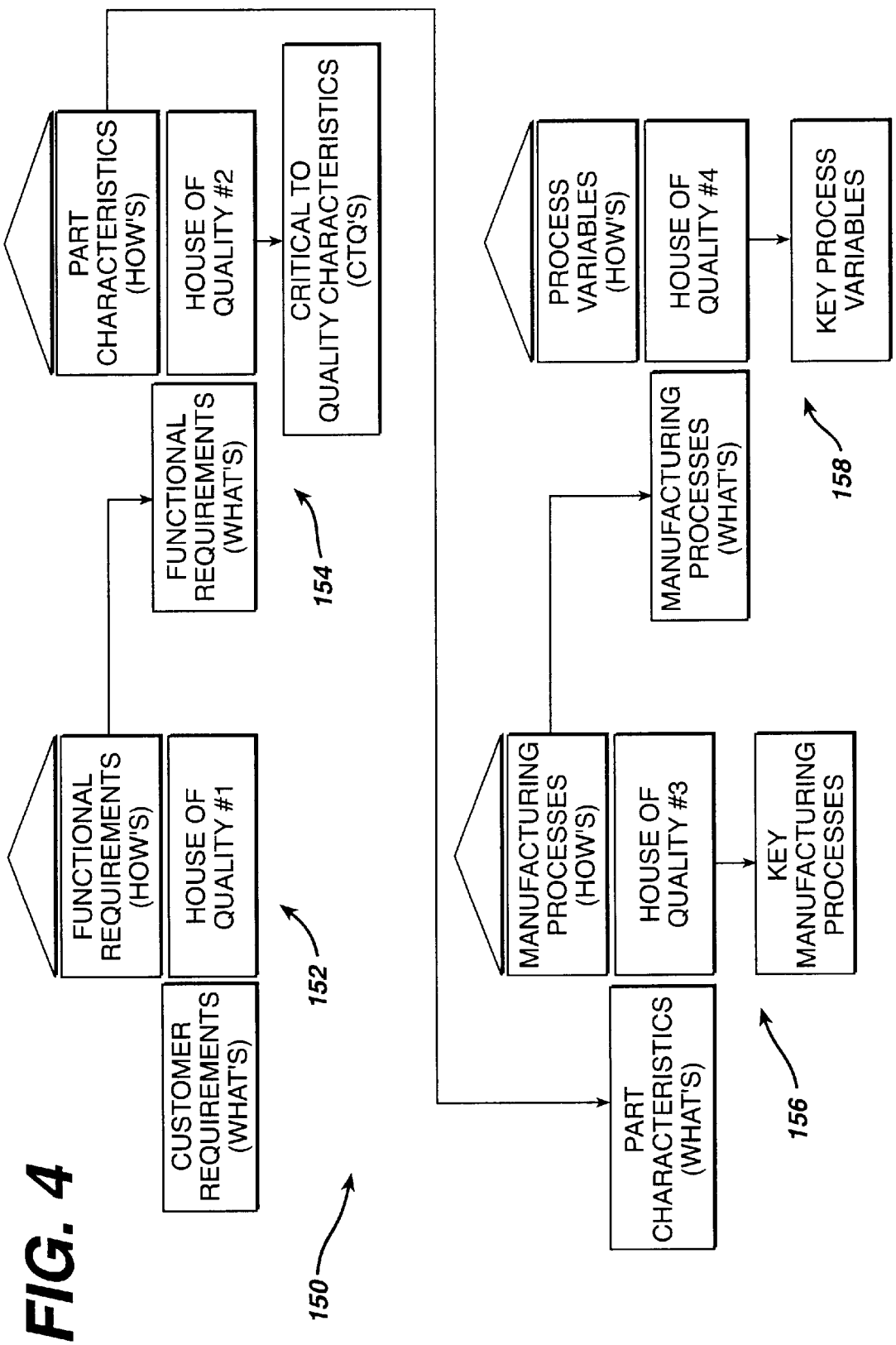
FIG. 4 illustrates the house of quality concept.
Figure 8:
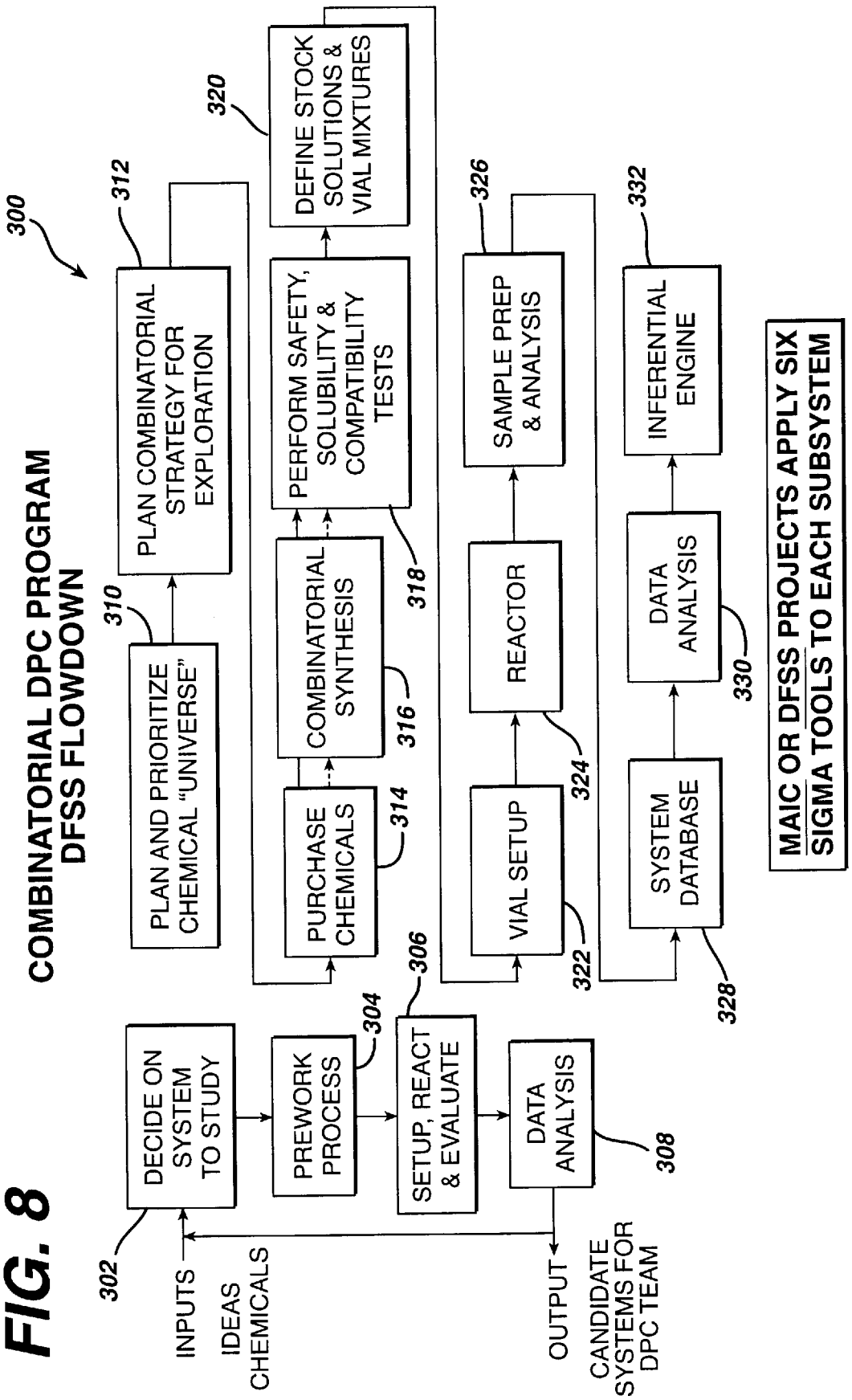
FIG. 8 illustrates the DFSS flowdown in a combinatorial DPC program.

FIG. 8 illustrates use of a DFSS flowdown in a Combinatorial DPC program and is exemplary of the "Formulate Concept Design" 106 and "For Each CTQ, Identify Design Parameters portions" 110 in FIG. 3. The main categories have equivalencies to the DFSS structure described in FIG. 3. In a DFSS or MAIC analysis most sub-systems have their own set of CTQ flowdowns.

The first major portion is a "Decide on System to Study" phase 302 that is equivalent to the Identify stage of DFSS and Measure stage of MAIC. Two of the elements of the flowdown in this phase are "Plan and prioritize the Chemical 'Universe'" 310 and "Plan Combinatorial Strategy for Exploration" 312.

A second major portion of a DFSS flowdown in a Combinatorial DPC program is called "Prework Process" 304 (similar to the Design stage in FIG. 3) and contains at least four elements including "Purchase Chemicals" 314, "Combinatorial Synthesis" 316, "Perform safety, stock & compatibility tests" 318, and "Define Stock Solutions & Vial Mixtures" 320.

A third major portion of a DFSS flowdown in a Combinatorial DPC program is called "Setup, React, & Evaluate" 306 (similar to the Optimize stage in FIG. 3) and contains at least three elements including "Vial Setup" 322, Reactor 324, and "Sample Preparation & Analysis" 326.

A fourth major portion of the DFSS flowdown in a Combinatorial DPC program is called "Data Analysis" 308 (equivalent to the Validate Stage in FIG. 3) and contains at least three elements including "System Database" 328, "Data Analysis" 330, and "Inferential Engine" 332.

Figure 9:
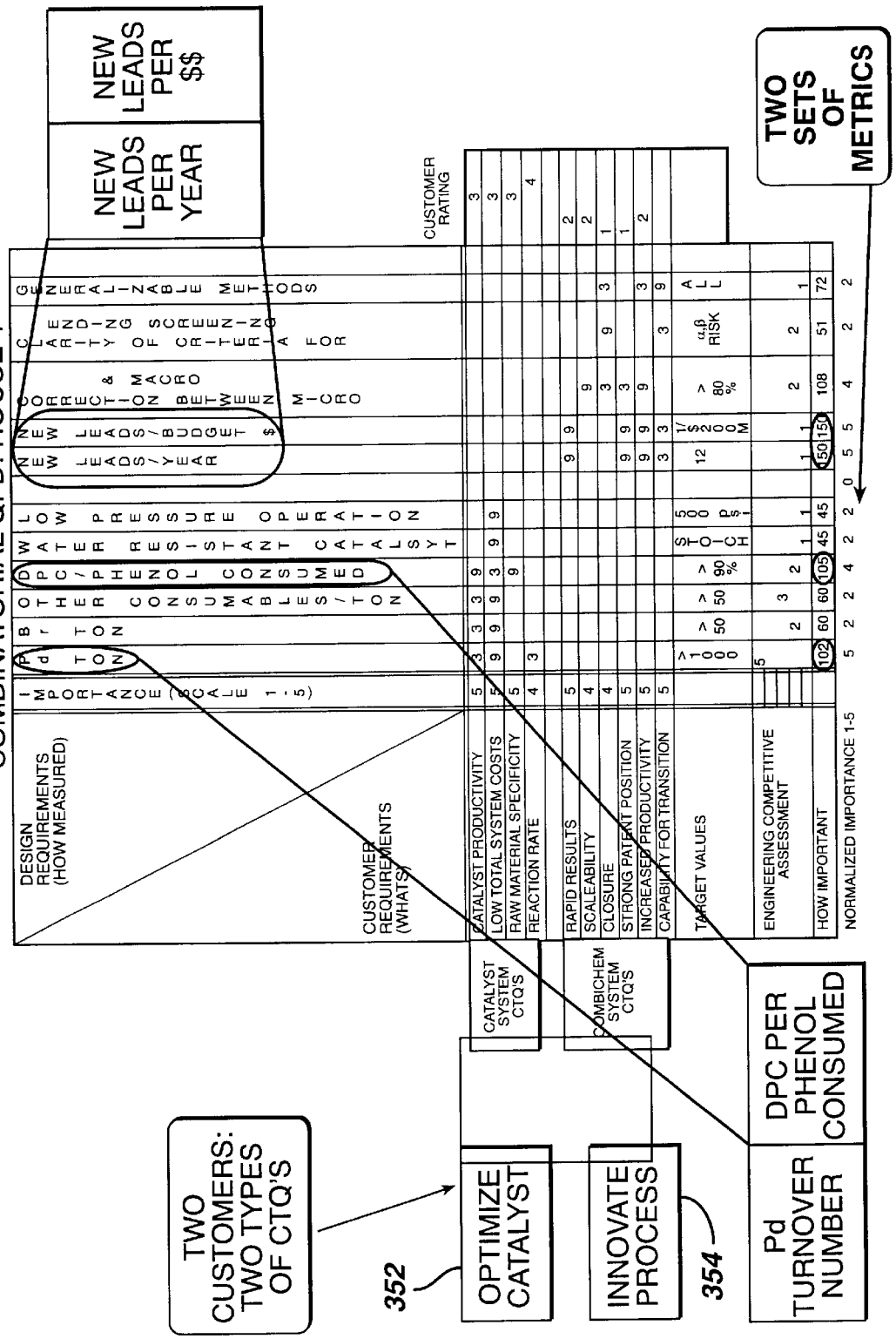
FIG. 9 illustrates the factors in Combinatorial QFD: House 1.

The CTQ's for the Combinatorial DPC Program come under a general goal of having a highly productive catalyst for DPC with a generalizable process. FIG. 9 illustrates a Combinatorial QFD: House 1 350. The Customer Requirements are the What's of the House 1. The Design requirements are the How's of House 1 and are also listed in FIG. 9. An importance factor is assigned to each Customer requirement and to each Design requirement listed in House 1. The importance factors are normalized to a 1–5 in importance. As shown in FIG. 9, the specific CTQ's come in two general categories, Optimize Catalyst 352 and Innovate Process 354. The "Optimize Catalyst" CTQ's include: (1) High throughput system: reactions per week; (2) Scalability from micro reactions to macro reactions; (3) Combinatorial synthesis of more than 100 co-catalysts; (4) Catalyst descriptors for prediction; and Identify at least one lead per month for the DPC chemical team.

The Management category of CTQ's includes: (1) the results placing manufacturer of DPC in a strong position; (2) the results permit the organization freedom to practice combinatorial methodology with out licensing of other technology; and (3) an ability to translate the combinatorial expertise to other technologies. Other research projects may have other CTQ's related to the specific project.

Figure 10:
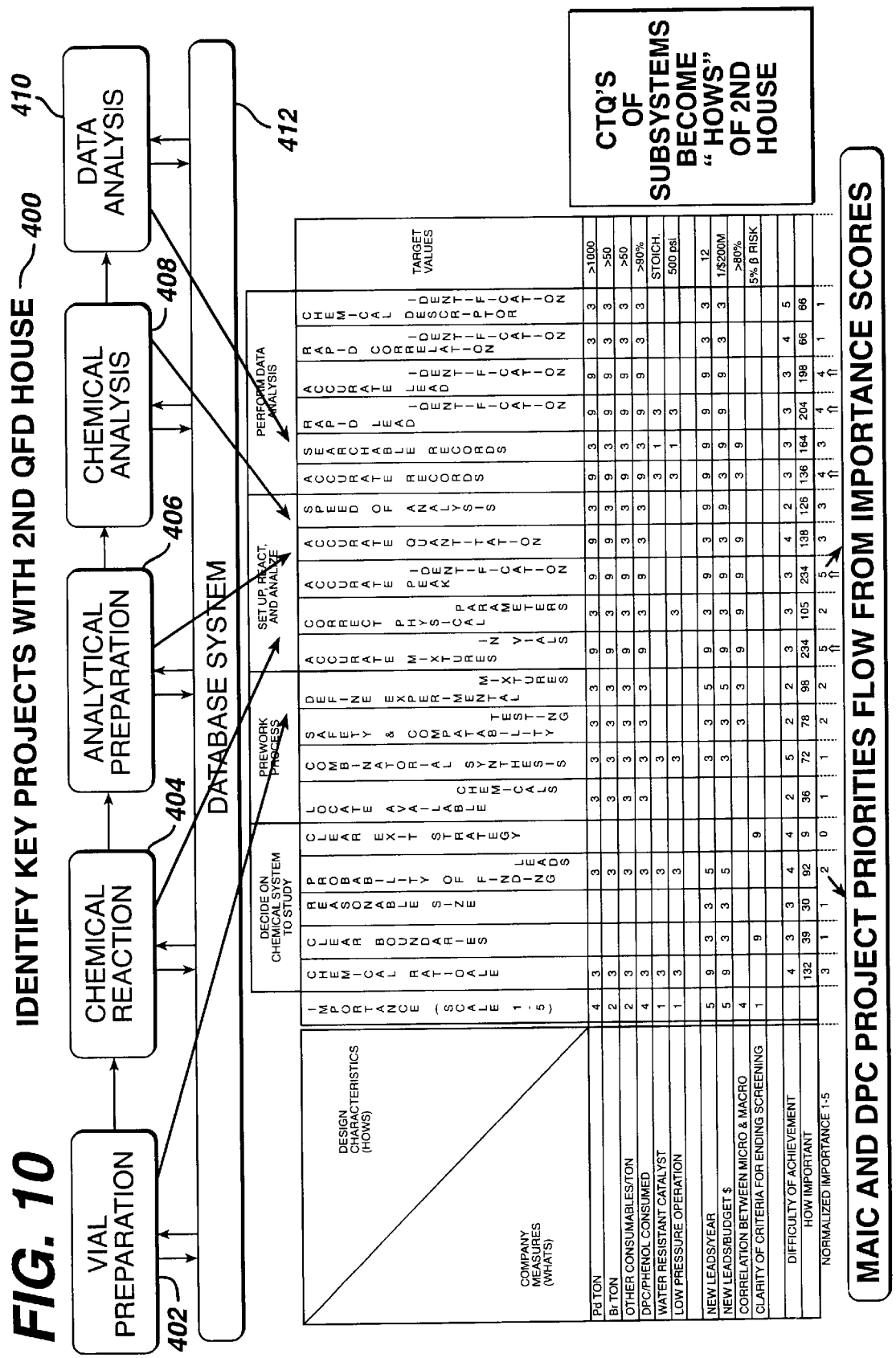
FIG. 10 illustrates the factors in House 2.

FIG. 9 illustrates the use of quality function deployment (QFD) houses discussed above as a method of flowing the CTQ's listed above through a research project such as the DPC Catalyst Project. After the CTQ's and measures are developed conventionally in House 1 as shown in FIG. 9, a novel usage of QFD is making the entire project the "product" which is analyzed by House 2 as illustrated in FIG. 10.

Individual process elements of the project are analyzed for CTQ's and those CTQ's become the "hows" in QFD $2^{nd}$ House. Doing this allows an effective prioritization of all the projects applied to each process element. The Design requirements of House 1 become the What's in House 2 as shown in FIG. 10. The CTQ's of the various subsystems become the "How's of the $2^{nd}$ House. The Hows of House 2 include "Decide on Chemical system to Study" 302, "Prework Process" 304, Setup, React and Evaluate 306, and Data Analysis 308. The main subsystems of a Combinatorial process Vial (Sample) Preparation 402, Chemical reaction 404, Analytical Preparation 406, Chemical Analysis 408, Data Analysis and Database System 412 are each analyzed and MAIC and DPC priorities flow from the importance score. The more important a combined what and how are to the overall process, the more attention it receives under a MAIC analysis. A DPC Project has a Vial Preparation 402 subsystem. In other Combinatorial projects this subsystem is more generally called Sample Preparation.

Figure 11:
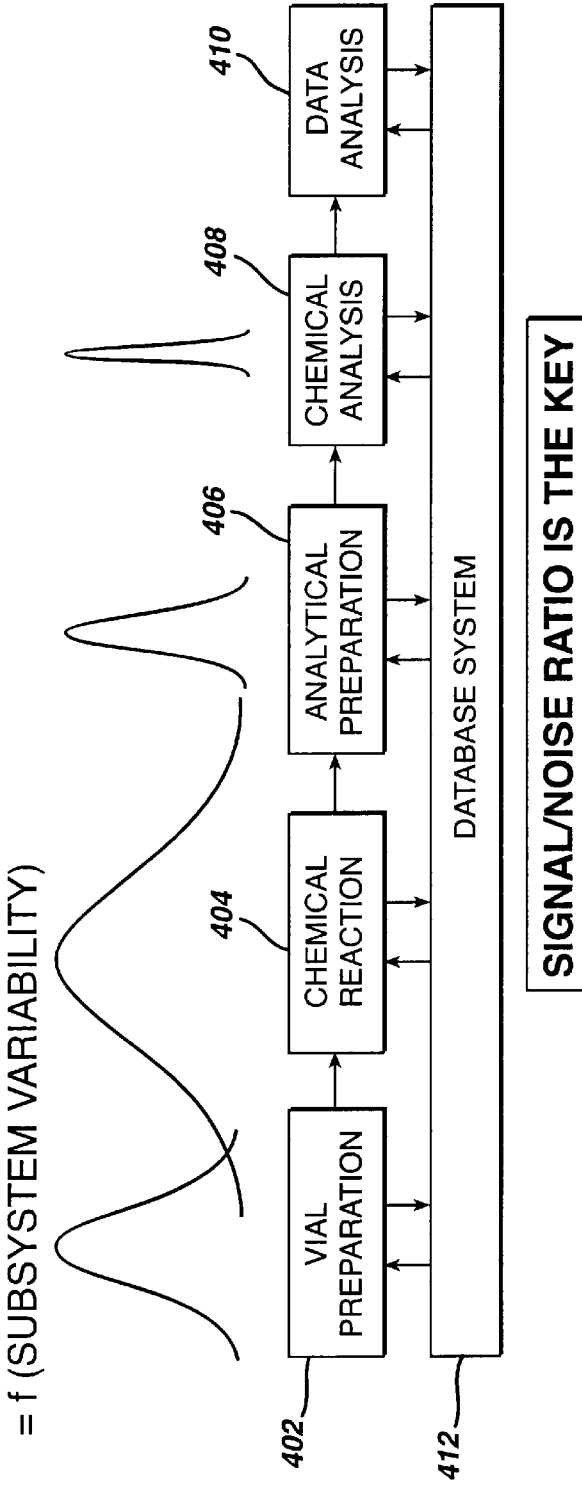
FIG. 11 illustrates a combinatorial transfer function.

The transfer function connects the overall steps of the project to the output specification which is measured as variability not the mean. FIG. 11 illustrates how the combinatorial transfer function is developed. The variability of each stage, vial (sample) preparation 402, chemical reaction 404, analytical preparation 406, chemical analysis 408, data analysis 410 and database system 412 are shown. The little y's (CTQ's) such as Accurate Lead Preparation, Rapid Lead Identification and Pd Turnover (TON) greater than 1000 are all elements towards the specification of achieving 95% probability of detecting 250 TON Catalyst Activity increase. The key to variability reduction is the signal to noise ratio. The fewer noise elements in each step of the process, the more predictable the overall result.

A top level scorecard, as discussed in above is used to determine the overall DPU's and Zst (value of short term sigma) for the major elements of any project, the parts, the process, the performance and software (if any) of each step. In the DPC combinatorial technology program this includes elements 402 through 412 shown in FIGS. 10 and 11. FIG. 12 illustrates the use of a scorecard to predict process capability with wide variability. As can be seen the variability's are very broad and produce Defects per Unit (DPU) and Zst levels are much less than satisfactory for meeting the CTQ's outlined above. In the illustrative DPC project, the unit is a Reactor Block containing 58 vials. The goal is to reduce the DPU from the 22.73 defects per 58 vials to a much lower number. The specification of the project is to develop a process that has a 95% probability of detecting 250 TON catalyst activity increase. The defects in the Process portion contain several portions with unsatisfactory levels. These include the manual vial preparation with a DPU of 5.58, manual analytical preparation with a DPU of 2.44 and the use of a manual database with 9.40 DPU. Those skilled in the art will readily realize that the goals and CTQs are exemplary only and that different goals and CTQs will be developed in various applications.

After the above analysis using DFSS techniques, specific Measure, Analyze, Improve, Control (MAIC) projects are assigned to specific portions of the overall combinatorial process. Two illustrations are outlined in FIGS. 13 and 14. FIG. 13 illustrates a MAIC project from the chemical analysis portion of the combinatorial process for the DPC catalysts study. The goal in this MAIC project is to reduce the variability in the Chemical Analysis portion of the combinatorial process. In the combinatorial process, there is typically extensive use of automation which requires process capability above laboratory norms. It was found in the DPC catalyst program that day to day drift created long term loss of capability that required manual peak picking. The MAIC project identified and used multiple internal standards which eliminate the effect of day to day variability, thus reducing the overall DPU's.

Figure 14:
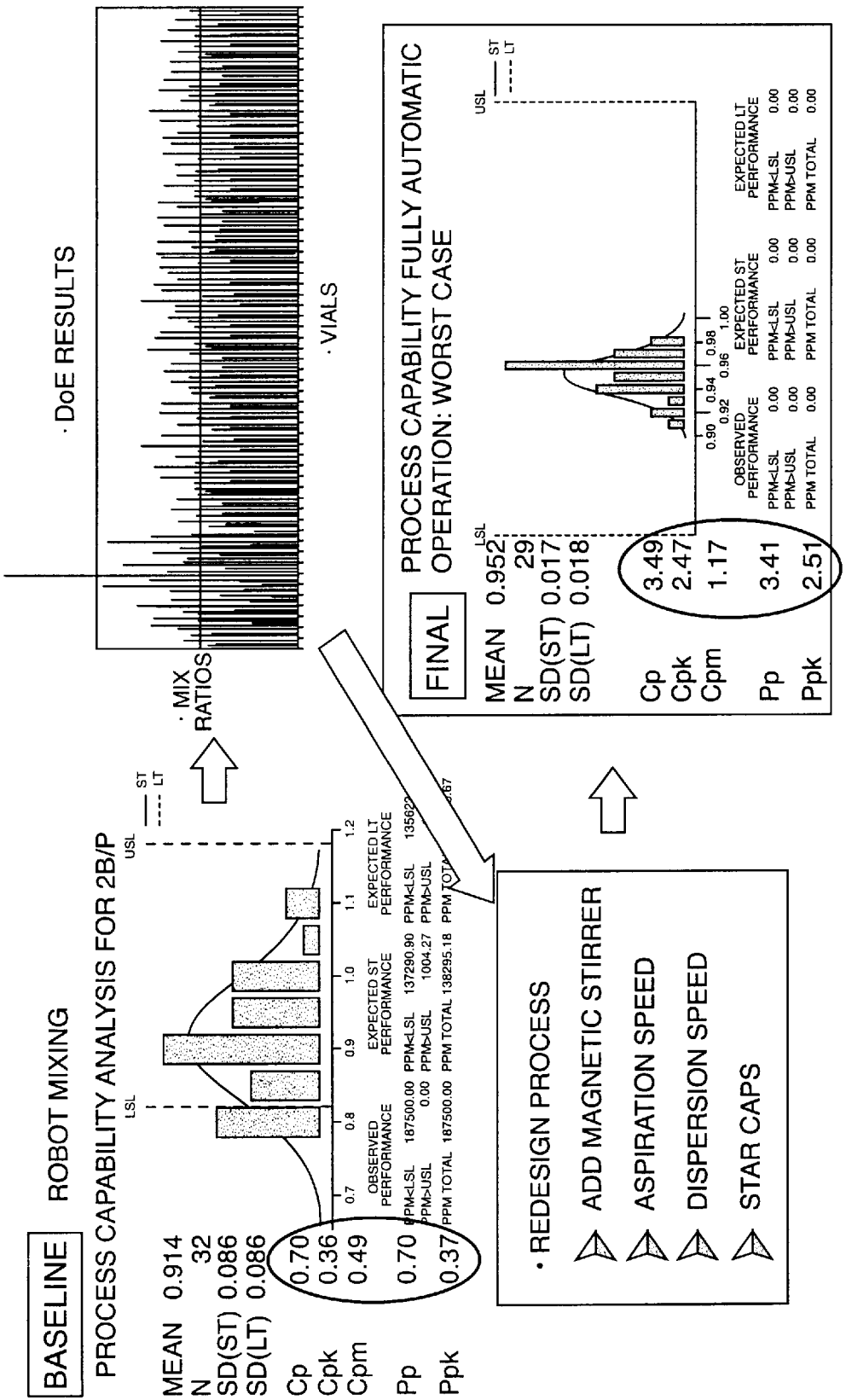
FIG. 14 illustrates a second specific MAIC project.

FIG. 14 illustrates a MAIC project for the Analytical Preparation portion of the combinatorial process for the DPC catalysts study. The goal in this MAIC is to reduce the variability in the Analytical Preparation portion. The MAIC project first mapped the Analytical Preparation process. It then identified the key steps contributing to the overall variability. An example of the variability of capability before the MAIC shows that the variability is very wide and the peak for Internal Standard (IS) delivery was below the Lower Specification Limit (LSL). After the use of DOE techniques within the MAIC project, the variability of IS delivery was significantly inside the LSL and Upper Specification Limit (USL), and the peak was also within the LSL and USL. The MAIC project for Analytical Preparation also compared a Robot approach for preparation as compared to a manual approach for preparation. The Robot approach significantly reduced the variability in the DPC Analysis. All of these improvements led to a DPC:IS ratio which was centered between its LSL and USL and showing very small variation.

Figure 15:
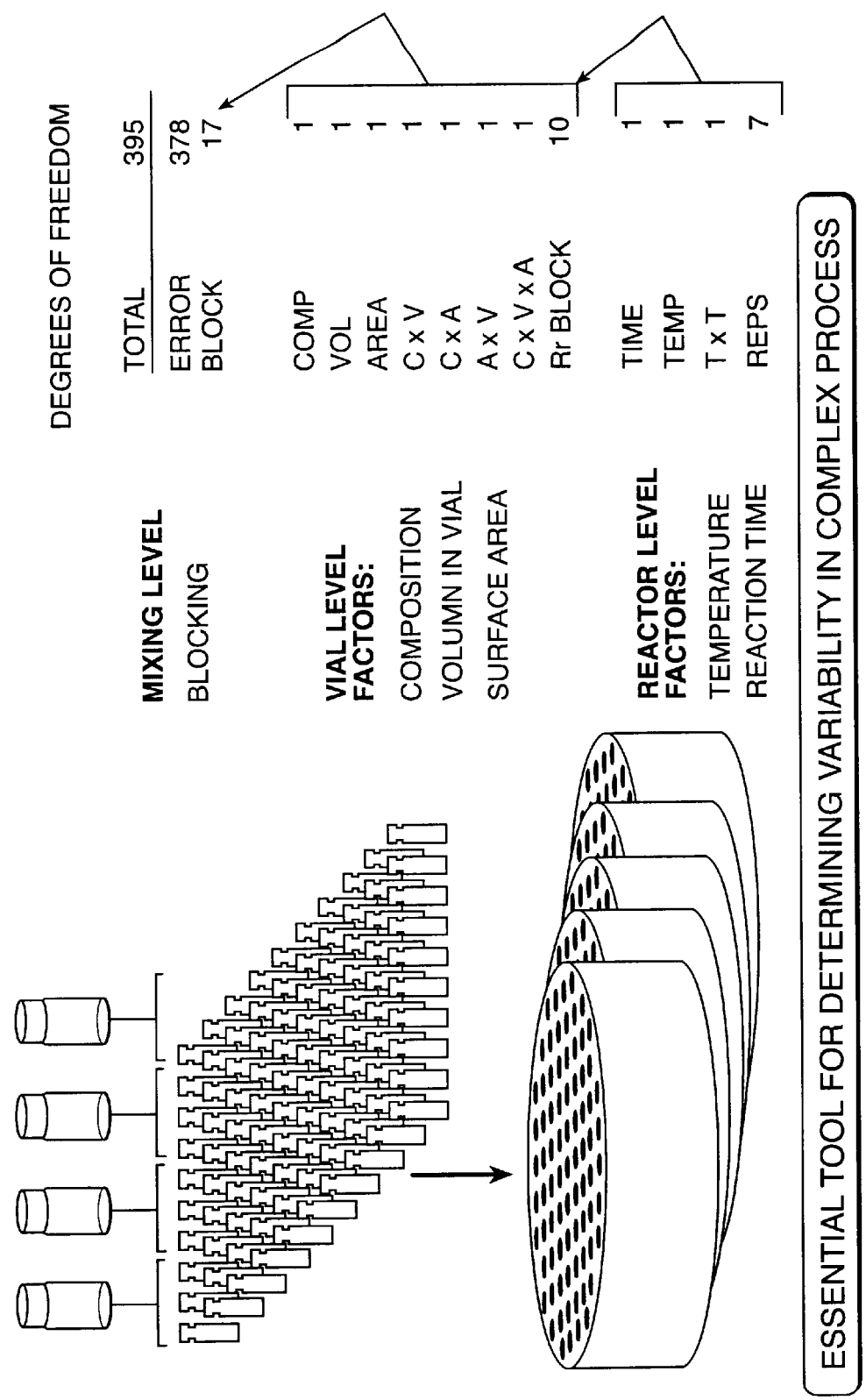
FIG. 15 illustrates the use of highly nested DOE's to find little x's.
Figure 16:
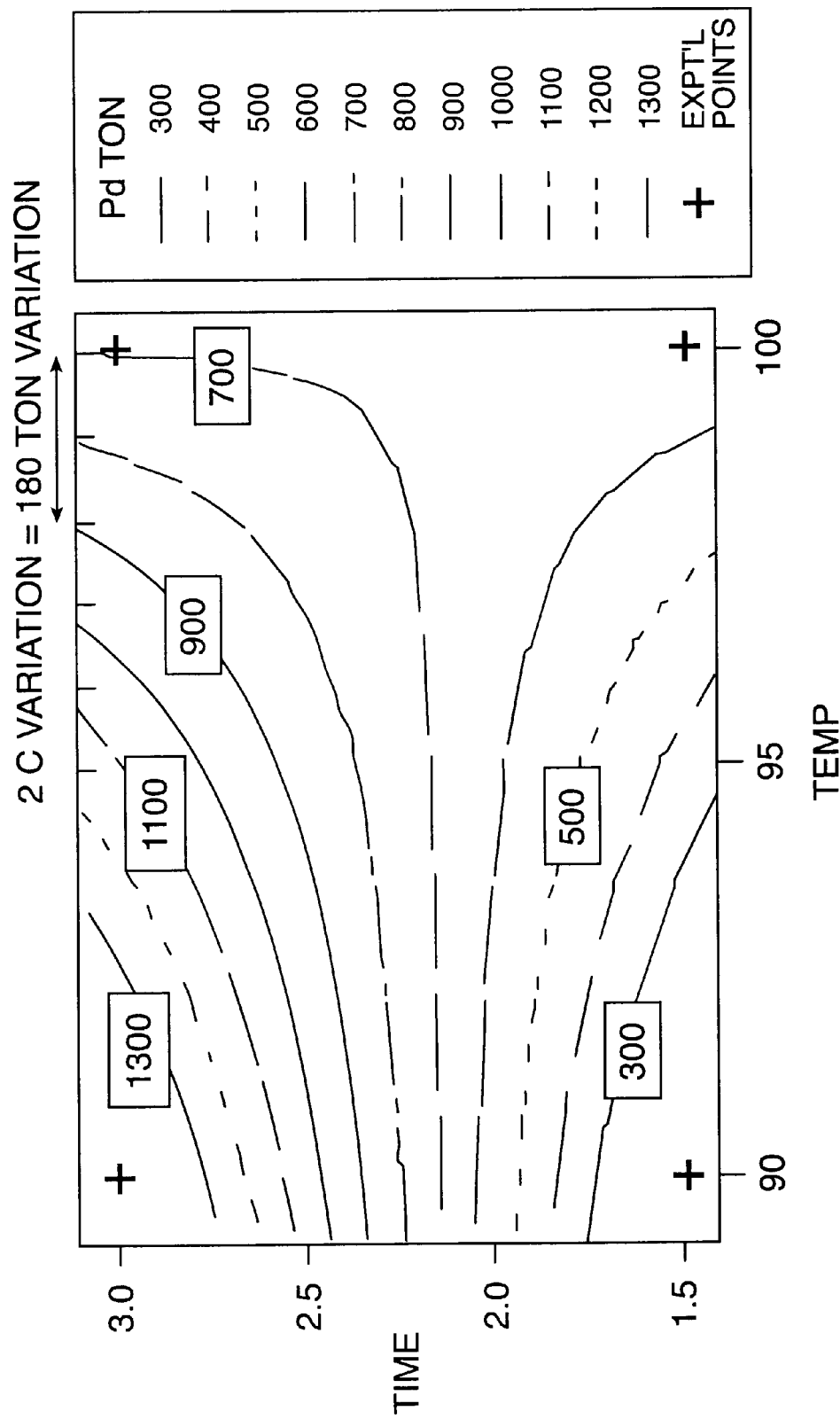
FIG. 16 illustrates the results of the DFSS analysis.

An additional DFSS tool for determining the variability in a complex process is the use of highly nested Design of Experiments (DOE's) to find the "little x's" as shown in FIG. 15. The fundamental structure of the combinatorial chemistry process leads to sources of variation from different experimental units (shown as "Levels" in FIG. 15). The variation arising from these Levels should be analyzed statistically in an appropriate manner (as indicated by the "Degrees of Freedom" table in FIG. 15). If this is not done properly, important sources of variation (little x's) may not be correctly identified. As shown in FIG. 16, using these DOE techniques resulted in focusing attention on the autoclave temperature capability.

Figure 17:
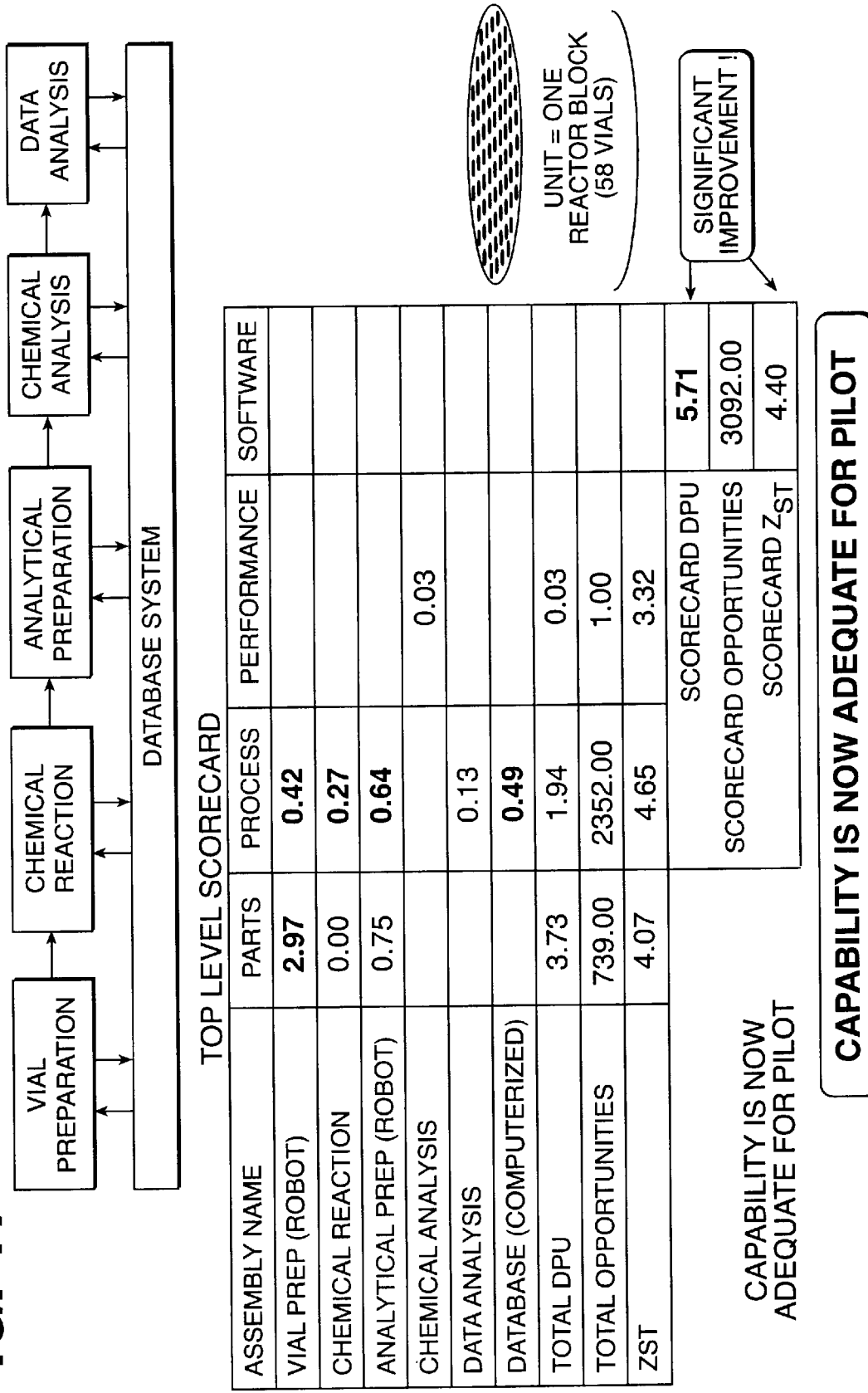
FIG. 17 illustrates using DOE techniques.

FIG. 17 illustrates a scorecard that demonstrates the improvement in variability after the study using DFSS/MAIC techniques with combinatorial technology. For example, the reduction in defects in the Chemical reaction portion went from 5.58 DPU to 0.27 DPU. The DPU improvement in the Analytical preparation portion went from 2.44 DPU when using a manual system to 0.64 DPU when a robot method was used. The most dramatic improvement was seen from using a manual database to a computerized database. The DPU change was from 9.40 to 0.49 DPU. As can be seen from the Scorecard illustrated in FIG. 17, the DPU went from 22.73 shown in FIG. 12 to 5.71. The improvement was significant enough that capability of developing catalysts in the DPC project was deemed adequate for a pilot run.

Figure 18:
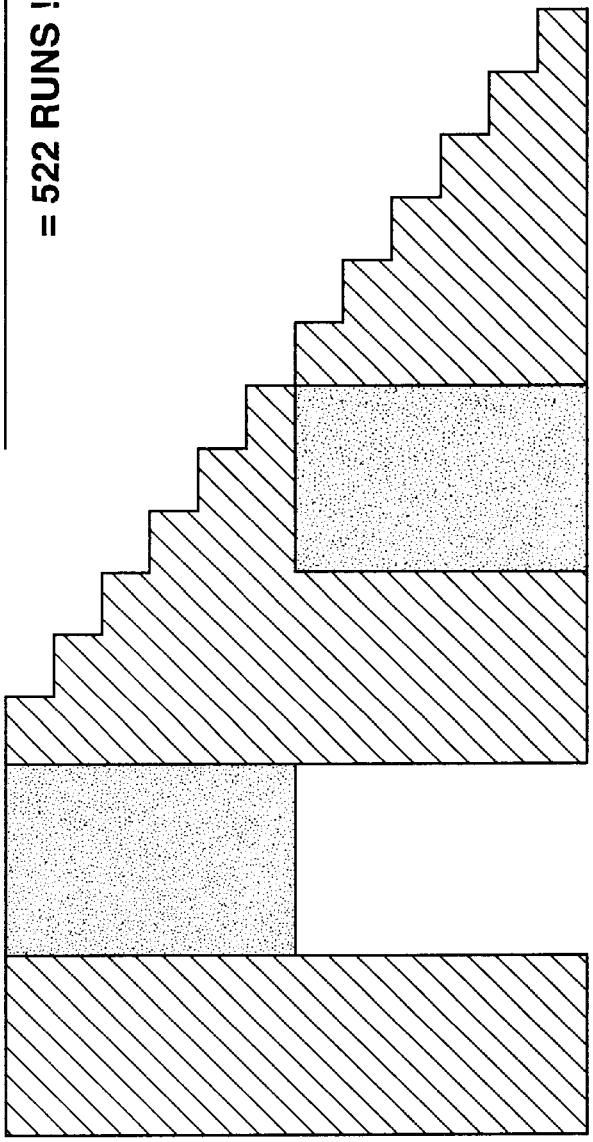
FIG. 18 illustrates the number of catalysts produced using the combinatorial technology with a six sigma analysis.

FIG. 18 illustrates a further use of the DOE techniques. The DFSS process identified the need for new DOE arrays, such as this combinatorial design that allowed complete examination of all two metal systems while reducing the time for finding new catalysts from 1.5 years to approximately 1 month. In addition, this DOE revealed two metal synergies for the DPC system, which became new catalysts.

The use of the six sigma (DFSS) tools in a research project focuses the project team on the variance of subsystems to reduce the overall variance. It also permits the research team to link and prioritize multiple complex steps with Quality Function Deployment (QFD). The research team can use scorecard techniques to roll up subsystem variance. Then the team can attack the variance using DOE tools. The use of the DFSS changes behavior and thinking by focusing on the variations in all steps of the process.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The computer apparatus may include an interconnection with the internet or an intranet allowing scientists in multiple locations to access six sigma flowdown programs and provide data on the various variabilities.

While the embodiment described supra is related to a catalyst research project using combinatorial techniques, the use of DFSS techniques in a research project is not limited to combinatorial chemistry or chemical research projects in general. The use of DFSS techniques in any research project containing variables that need to be focused upon is relevant to the invention.

While the invention has been described with reference to preferred embodiments, it will be understood by those skilled in the art that various changes may be made and equivalents may be substituted for elements thereof without departing from the spirit and scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

What is claimed is:

1. A method for using design for six sigma techniques for managing a research project, said method comprising:

selecting a unit of a step of a research project;

identifying a defect associated with the selected unit;

measuring a number of the identified defects per selected unit of the step in a conducted procedure of the research project procedure; and conducting an altered research project procedure under conditions determined to decrease the measured number of defects per selected unit.

2. The method of claim 1, additionally comprising identifying critical to quality characteristics of the said research project according to requirements defined by a customer and identifying only defects that are defects associated with the critical to quality characteristics.

3. The method of claim 1, wherein said research project comprises a combinatorial material development project.

4. The method of claim 1, wherein said project comprises a search for catalysts.

5. The method of claim 4, wherein said catalyst are for the production of diphenyl carbonate.

6. The method of claim 1, additionally comprising measuring a defects per selected unit variability for portions of said research project selected from sample preparation, chemical reaction, analytical preparation, chemical analysis, data analysis and database system.

* * * * *